United States Patent [19]

Guy et al.

[11] 4,227,319
[45] Oct. 14, 1980

[54] FLIGHT-CONTROL ELECTRO-HYDRAULIC SIMULATOR

[75] Inventors: Bernard F. R. Guy, Versailles; Michel A. B. Lacroix, Velizy, both of France

[73] Assignee: Le Materiel Telephonique, Boulogne-Billancourt, France

[21] Appl. No.: 16,963

[22] Filed: Mar. 5, 1979

[30] Foreign Application Priority Data

Mar. 9, 1978 [FR] France ................................. 78 06832

[51] Int. Cl.³ ........................ G09B 9/08; B64C 13/46
[52] U.S. Cl. ................................... 35/12 S; 244/228
[58] Field of Search ...................... 35/12 S; 244/83 D

[56] References Cited

U.S. PATENT DOCUMENTS

| | | | |
|---|---|---|---|
| 2,851,795 | 9/1958 | Sherman | 35/12 S |
| 3,220,121 | 11/1965 | Cutler | 35/12 S |
| 3,395,878 | 8/1968 | Westbury | 244/83 D |
| 3,463,866 | 8/1969 | Staples | 35/12 S X |
| 3,529,365 | 9/1970 | Shelley | 35/12 S |

FOREIGN PATENT DOCUMENTS

| | | | |
|---|---|---|---|
| 1447288 | 6/1966 | France | 35/12 S |
| 2178495 | 10/1973 | France | 35/12 S |
| 958326 | 5/1964 | United Kingdom | 35/12 S |

Primary Examiner—William H. Grieb
Attorney, Agent, or Firm—Roland Plottel

[57] ABSTRACT

The invention relates to the simulation of an aircraft's flight controls and particularly the mechanical reactions produced on the pilot's controls.

The reaction force is produced by a servo-controlled, hydraulic actuator whose piston moves a distance X which is proportional to the deflection of the pilot's control. A servo signal, whose amplitude is proportional to the component of the reaction force depending on the displacement X, is obtained by digital calculation, filtering and analogue multiplication.

The invention can be applied to flight training systems and to artificial feel systems (AFS).

10 Claims, 6 Drawing Figures

FLIGHT-CONTROL ELECTRO-HYDRAULIC SIMULATOR

BACKGROUND OF THE INVENTION

1. Field of the Invention

The present invention relates to the simulation of the vehicle control forces felt by an operator. It relates more particularly to the simulation of the flight controls and the mechanical reactions transmitted to a pilot by such control devices. The present invention can be applied, not only to vehicle training systems but also to the actual vehicle controls. It can, thus, be advantageously applied to aircraft in artificial feel-force systems (AFS).

2. Discussion of the Prior Art

French Pat. No. 2,178,495, filed by the present applicant, relates to a control simulator in which the simulated reaction is produced by a servo-controlled, hydraulic actuator. The piston of this actuator moves a distance X which is proportional to the movement of the control device. A servo signal is obtained as a function of this movement by entirely analogue computing circuits.

One of the more important aspects of the simulator according to the instant invention, which also includes a servo-controlled, hydraulic actuator, is that the servo signal which depends on the distance X is obtained by digital calculation, filtering and multiplication without any difficulty in smoothing.

For reasons of cost, operational convenience, and safety, training in vehicle operation and control is now conventionally given, not with the vehicles themselves, but by means of training systems especially designed for this purpose. Aircraft, for example, whose operation requires the application of highly developed and complicated techniques and for which stringent safety conditions are demanded, can only be left in the hands of fully trained flight crews. The cost of training such crews would be exorbitant if a large part of the training was not replaced by instruction given on the ground, under much better conditions, by means of flight training systems.

These systems, commonly known as "flight simulators," are designed to faithfully reproduce the environmental conditions experienced in a real crew compartment. The simulated crew compartments are mounted on platforms and subjected to accelerations which are comparable to those encountered in normal flight. The desired motion is determined by computers, as a function of the presumed manoeuvres executed and the external conditions (windspeed and wind direction) which are programmed or initiated by an instructor during execution of an exercise. All aircraft instruments and controls are faithfully simulated with regard to their appearances, installation and apparent operation. The simulation can be performed, not only for the main flight controls in yaw, pitch and roll, but also for certain secondary controls, for example when taxiing on the ground (nosewheel steering control) or emergency controls (undercarriage control). The reaction of each of these controls is specific to the particular pilot-controlled aircraft and varies as a function of the type of manoeuvre, the mode of action of the control device and the operating status of the control considered. Clearly, a thorough knowledge of these reactions enables a pilot to better sense the behavior of the aircraft and to act accordingly on the controls. Faithful simulation of the reactions which are transmitted by the flight controls is, thus, essential in a complete flight training system.

An important feature which is required for flight-control simulators is the simulation of defective operation. Electronic systems are particularly suitable for such simulation because they are easily adaptable to the simulation of various types of aircraft.

In an aircraft, a control system comprises the pilot's controls (stick, wheel, pedals, etc.) which are located in the crew compartment, linkages (rods, levers, cables, etc.) which are located in the fuselage, and the control surfaces (ailerons, flaps, etc.) which are located on the wings. In large aircraft, the linkages also include hydraulic servocontrols and artificial feel systems (AFS's).

The amplitude of the aerodynamic forces and the complexity of the linkages respectively due to the speed and span of the aircraft make it impossible to operate the control surfaces directly. The necessary forces are, in fact, produced by hydraulic, servo-assisted controls whose irreversibility prevents the transmission of aerodynamic reactions back to the pilots' controls.

In order to provide the pilot with the reactions required for correct flying of the aircraft, AFS's, also known as feel-force systems, are located in the linkages before the servocontrols and transmit to the pilots' controls and therefore to the pilots forces similar to the real reactions of the control surfaces. The simulator in accordance with the invention is thus particularly suitable for producing an AFS.

In certain exceptional cases, flight control may be simulated by using the actual control system of an aircraft. This method is not widely used, however, because of the high cost of such control systems, for which high quality is required, and also because of the size of the linkages required for large aircraft. Moreover, the latter are often duplicated for safety reasons, which is in conflict with the compactness required of training systems.

SUMMARY OF THE INVENTION

One of the characteristics of the simulator according to the invention is an electronic system for producing by digital calculation, digital filtering and analogue multiplication, a servo signal which is a function of the hydraulic actuator displacement X, which is suitably smoothed on either side of the control threshold zone and which requires no smoothing within this zone.

Other characteristics of the flight control simulator in accordance with the invention appear in the following description of a practical example.

DETAILED DESCRIPTION

The design of an actual simulator is based on the determination, by means of a simplified theoretical model of the various parameters (inertia, elasticity, friction) involved, of the operating characteristics of the control considered, and on the faithful simulation of the behavior of this control by an appropriate arrangement of mechanisms and hydraulic, pneumatic or electronic devices which behave in accordance with the equations of the theoretical model.

Figure 1:
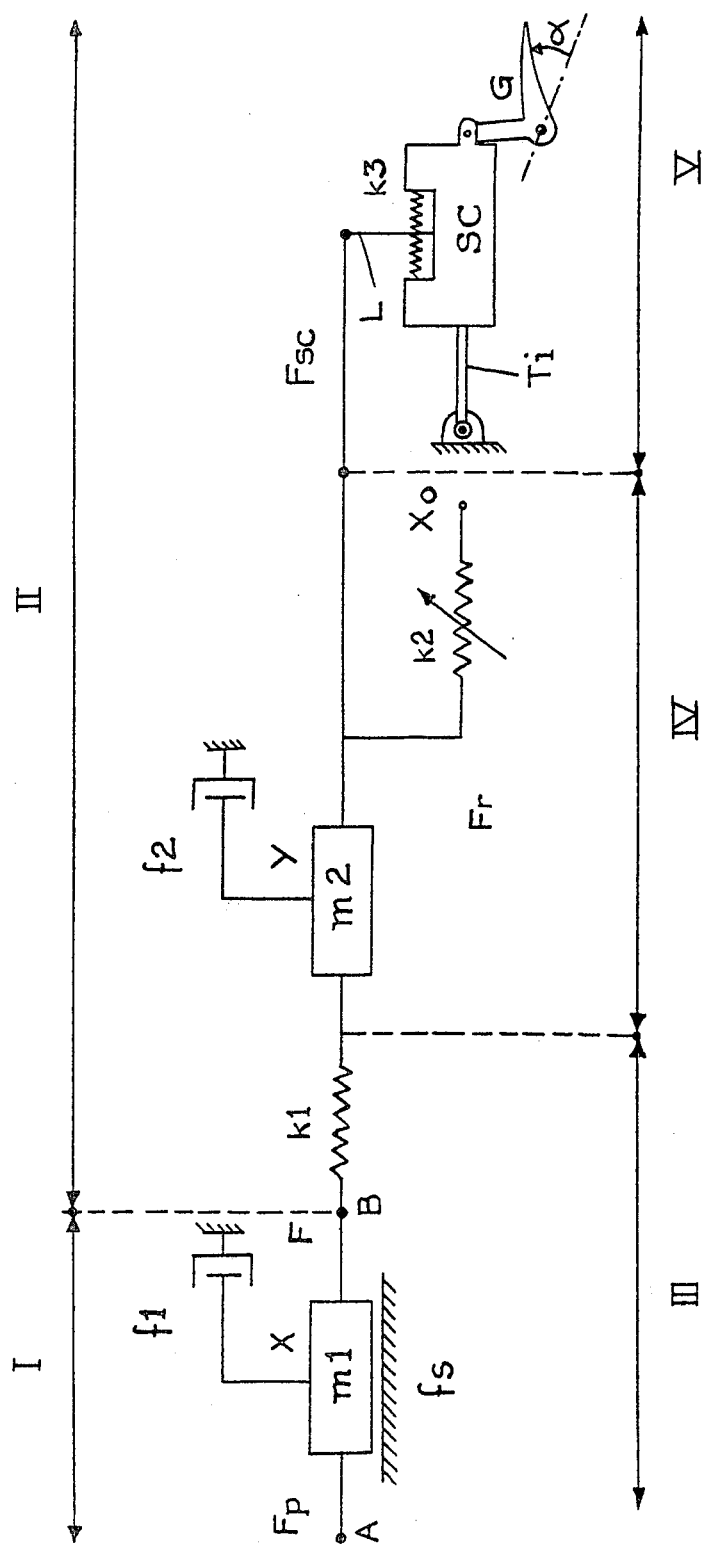
FIG. 1 illustrates a mechanical model to which may be compared a pitch control system.

In addition to the pilot's control, and as shown in FIG. 1, a typical prior art pitch control system includes, for example, linkages by means of cables an AFS, a servo-control SC and a control surface G. The operating equations of the mechanical model shown in FIG. 1 may be considered as being those of the instant control also. The part of the linkage before the AFS is represented in III by a mass ml, a stiffness kl, a viscous damper fl and a friction fs. The movement of the mass ml is equal to the displacement X of the simulator actuator piston and can therefore also be designated by X. The part of the linkage after the AFS as well as the latter are represented in IV by a mass m2 whose displacement is designated by Y, a variable stiffness k2 (spring) corresponding to the static force developed by the AFS, and a viscous damper f2. The adjustment displacement Xo is transmitted to the anchor point of the stiffness k2. Th force fp exerted by a trainee is applied to point A, whilst the force transmitted by the cable to point B is equal to the amplitude F of the servo signal depending on the displacement X. The various parameters of the model are variable as a function of the flight configuration and the status of the control. The stiffness k2 is variable, for example, as a function of the Mach number, instantaneous airspeed and altitude. Servocontrol SC may be considered to be the stiffness k3 of the protective springs placed either side of the input lever L of this servocontrol. Movement of this lever away from its center position causes the servocontrol to move on its piston Ti, thereby rotating the aircraft's control surface through an angle a.

The previously discussed patent relates to a control simulator which, in addition to an hydraulic actuator, a feed servovalve and a plurality of sensors (e.g., force, velocity and displacement transducers), includes electronic circuits comprising a plurality of servocontrol loops. One of these loops produces a signal whose amplitude is equal to the value of a force F which is a function, among other parameters, of the displacement X of the actuator piston, in accordance with the following relationship:

$$F = K(X - Xo)$$

In the prior art, the coefficient K is determined by an analogue computer as a function of the theoretical model. The adjustment parameter Xo determines the equilibrium position of the pilot's control. In an aircraft, this value is determined by a control operated by the pilot (trim control). In a simulator, the control stick is attached to the actuator piston by a linkage. The model shows that the force which is transmitted to the actuator piston and exerted by the trainee in order to hold the control stick, or move it slowly, is equal to the amplitude F of the servo signal considered, except for the friction forces. The reality of the simulation therefore depends largely on the accuracy with which the analogue computer is capable of giving coefficient K a variable value such that $F = K(X - Xo)$ is equal to the value of the real force Fr developed in the aircraft.

Figure 2:
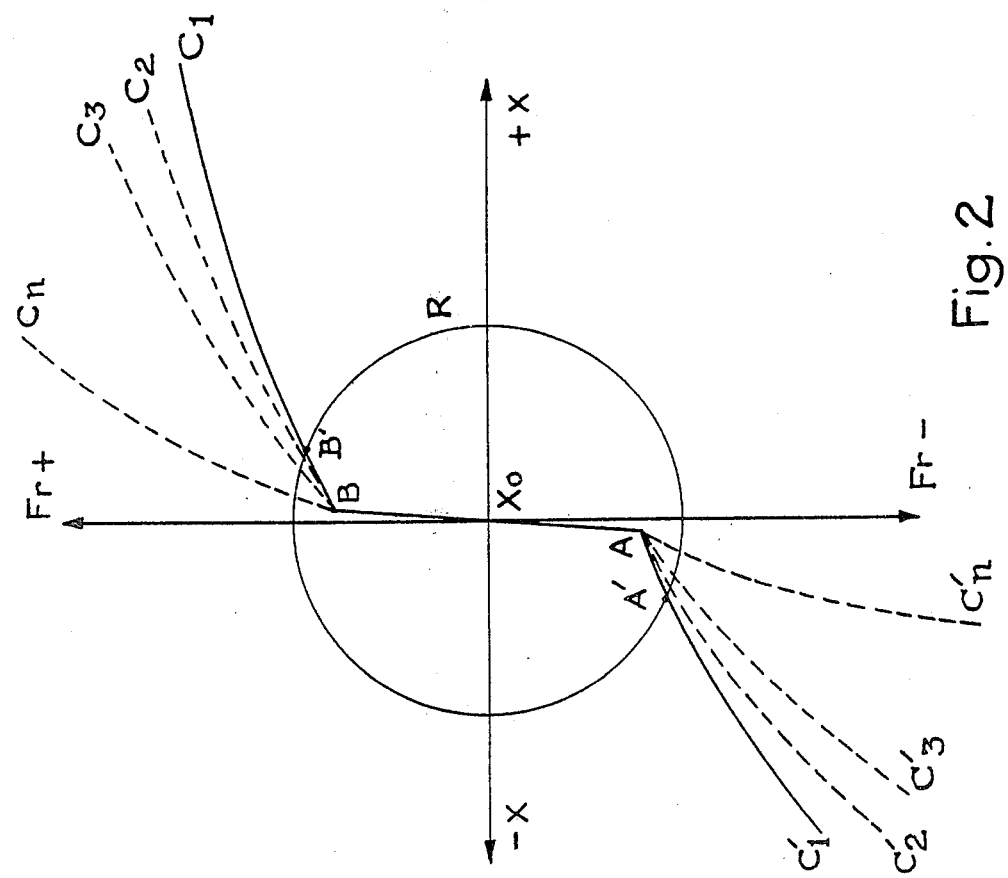
FIG. 2 shows a family of curves relating to the static force Fr exerted on a pitch control.

Neglecting frictional forces, measurement of the static force Fr exerted on a real control surface, as a function of the control stick position, leads to the family of curves shown in FIG. 2. Each of these curves corresponds to a particulr flight configuration characterized, for example, by respective values determined for the Mach number, instantaneous airspeed and altitude. Since in the simulator the control stick movement is proportional to the displacement X of the actuator piston, the force Fr is shown as a function of this displacement, such that $Fr = f(X)$. These curves have a middle section AB which crosses the X-axis at a point Xo. This high-slope common section constitutes the control threshold force. This threshold is intentionally introduced into the flight control by means of an AFS. For curve C1, C'1, closest to the X-axis, this slope is approximately fifteen times greater than that of the outer sections of the curve. The localized force created in this manner over a fraction of a degree of control surface deflection enables the pilot to recognize easily the neutral position of the control, thereby facilitating instinctive action on this control stick in one direction or another. In stable flight, because of pilot action the point representing the control stick position oscillates in a practically random manner inside the circle R, i.e. for curve C1, C'1 between two variable extremes, each located on one side of the neutral zone AB in the two effectively active zones, and the inverse effects AA' and BB' of the control. The characteristics of these curves are introduced into the model shown in FIG. 1 by means of parameters k1 and k2.

Figure 3:
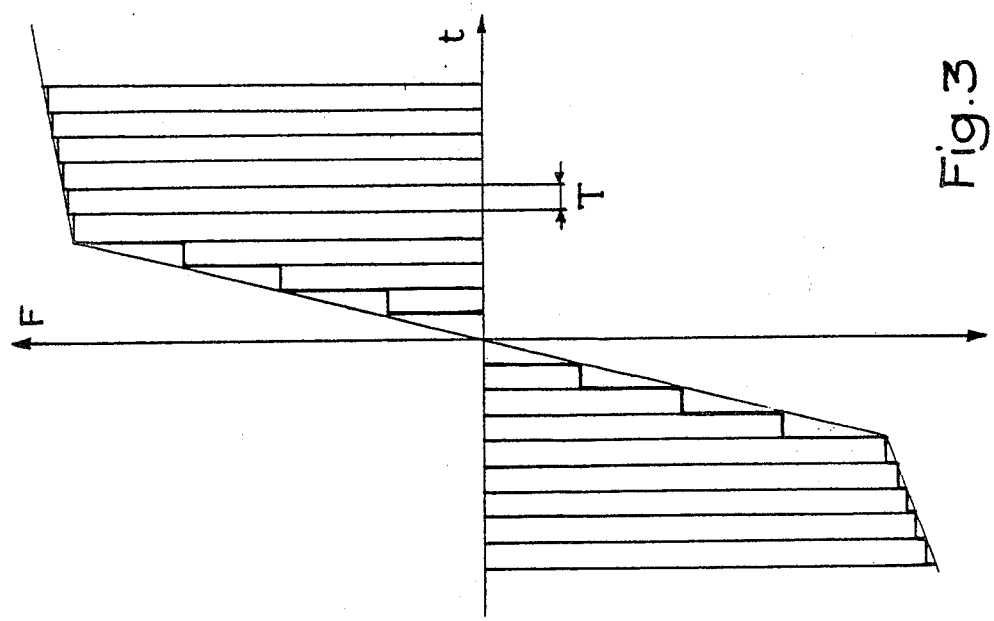
FIG. 3 represents the stepped signal resulting from conventional digital calculation of the force F.

Analogue electronic ciruits are capable of producing the functions which correspond to these curves, but give rise to adjustment and stability problems which increase rapidly with the number of parameters involved. On the other hand, digital computation circuits are particularly advantageous because of their stability and programming flexibility. They have, however, one disadvantage which detracts from the required realism of simulation, and that disadvantage is that digital computing circuits operate on quantized values only. The input signals to be processed are thus sampled, and the output signals, whose steps correspond to successive computed values, must then be suitable smoothed. The smoothing of a signal of amplitude F is difficult for several reasons: (1) the excessive slope of the curves $Fr = f(X)$ in the zone AB; (2) the essentially variable control velocity; and (3) the cycle time of the computer, which should be as short as possible. This results in the trainee feeling an unrealistic "granular" force, which is especially unacceptable since it appears mainly in the threshold zone of the control which is continuously traversed during stable flight. FIG. 3 shows the excessive size of the steps in the control threshold zone resulting from conventional digital calculation of the amplitude F, based on the model shown in FIG. 1 and when the control is assumed to move at constant velocity and neglecting friction. In reality, the direction and velocity of control motion are highly variable. Thus, a simple filter cannot remove the "granular" effect caused by the presence of these steps and which affect the reaction forces on the pilot's control in the simulator.

Figure 4:
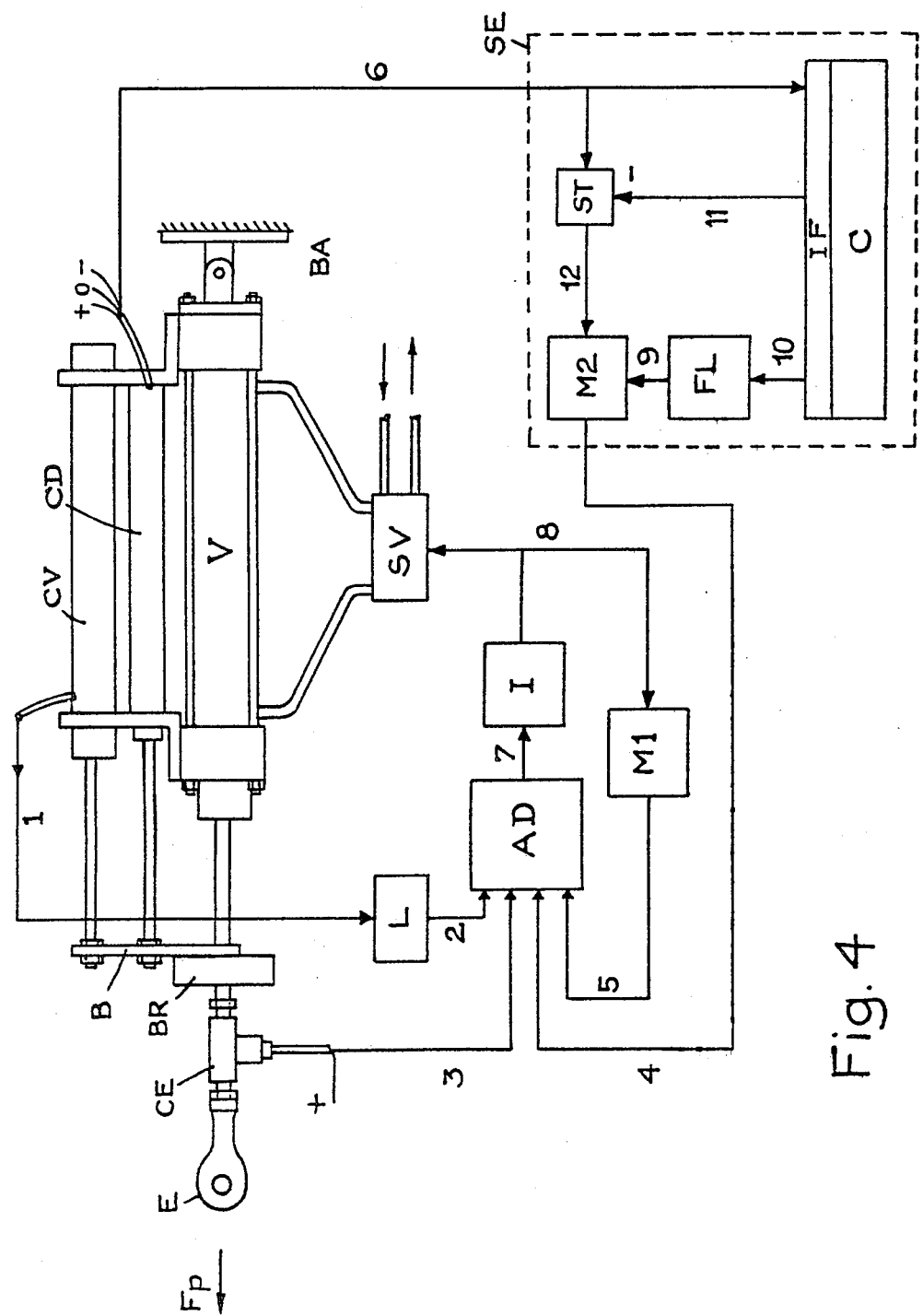
FIG. 4 is a diagram of a control simulator in accordance with the invention.

These difficulties are avoided in the control simulator in accordance with the invention. As shown in FIG. 4, a double-acting hydraulic actuator V produces a force which simulates the flight-control reaction and which, opposing the force Fp exerted by the trainee, tends to return the control stick to its neutral position. The displacement of the actuator piston, designated by X, is proportional to the deflection of the pilot's control. The end of the actuator hinges on a fixed frame BA. The force Fp is applied to the piston of the actuator via an end-piece E, a stress gauge CE and a bearing box BR which enables the actuator piston rod to rotate with respect to the stress gauge. A velocity sensor CV and a displacement sensor CD are mounted on the actuator body. Their control rods are attached to the actuator piston rod by means of the link arm B. Movement of the actuator piston is controlled by a feed servovalve SV whose input signal on line 8 is produced by a system of electronic circuits comprising several servocontrol loops. A first servocontrol loop relates to the signal on lead 1 which is produced by the velocity sensor CV. The amplitude of this signal is equal to the actuator piston displacement velocity $X'$. An amplifier and limiter L to which the signal on lead 1 is applied produces a signal on lead 2 whose amplitude is equal to the absolute value of the friction fs of the linkage model III (FIG. 1), and whose sign depends on that of velocity $X'$. A second servocontrol loop relates to the signal on lead 3 which is produced by the stress gauge CE. The amplitude of this signal is equal to the force applied to the actuator piston. A third servocontrol loop relates to the signal on lead 8 which is applied to the input of the serovalve SV. The velocity $X'$ of the actuator piston is proportional to the amplitude of this signal. A multiplier circuit M1, whose multiplication factor is equal to the damping f1 of the linkage model III, produces a signal on lead 5 of amplitude $f1.X'$. A fourth servocontrol loop relates to the signal on lead 6 which is produced by the displacement sensor CD, whose amplitude is equal to X. An electronic system SE to which this signal is applied produces a signal on lead 4 of amplitude $F=K(X-Xo)$. The signals on leads 2, 3, 4 and 5 in the various control loops are applied to a summing circuit AD which produces a signal on lead 7 which is equal to the sum of these various signals. The signal on lead 7 is applied to the integrator circuit I whose integration constant is equal to the mass m1 of the linkage model III. The signal on lead 8 produced by this circuit constitutes the input signal of the servovalve SV.

The transfer function of the circuits described gives the value of the force fp exerted on the pilot's control in the simulator:

$$F_p = m1\ X'' + f1X' \pm K(X-Xo)$$

The first three terms of the right hand side of this equation represent the forces relation to the components located in part I of the mechanical model, while the term $K(X-Xo)$ represents the force corresponding to the components in part II.

Figure 5:
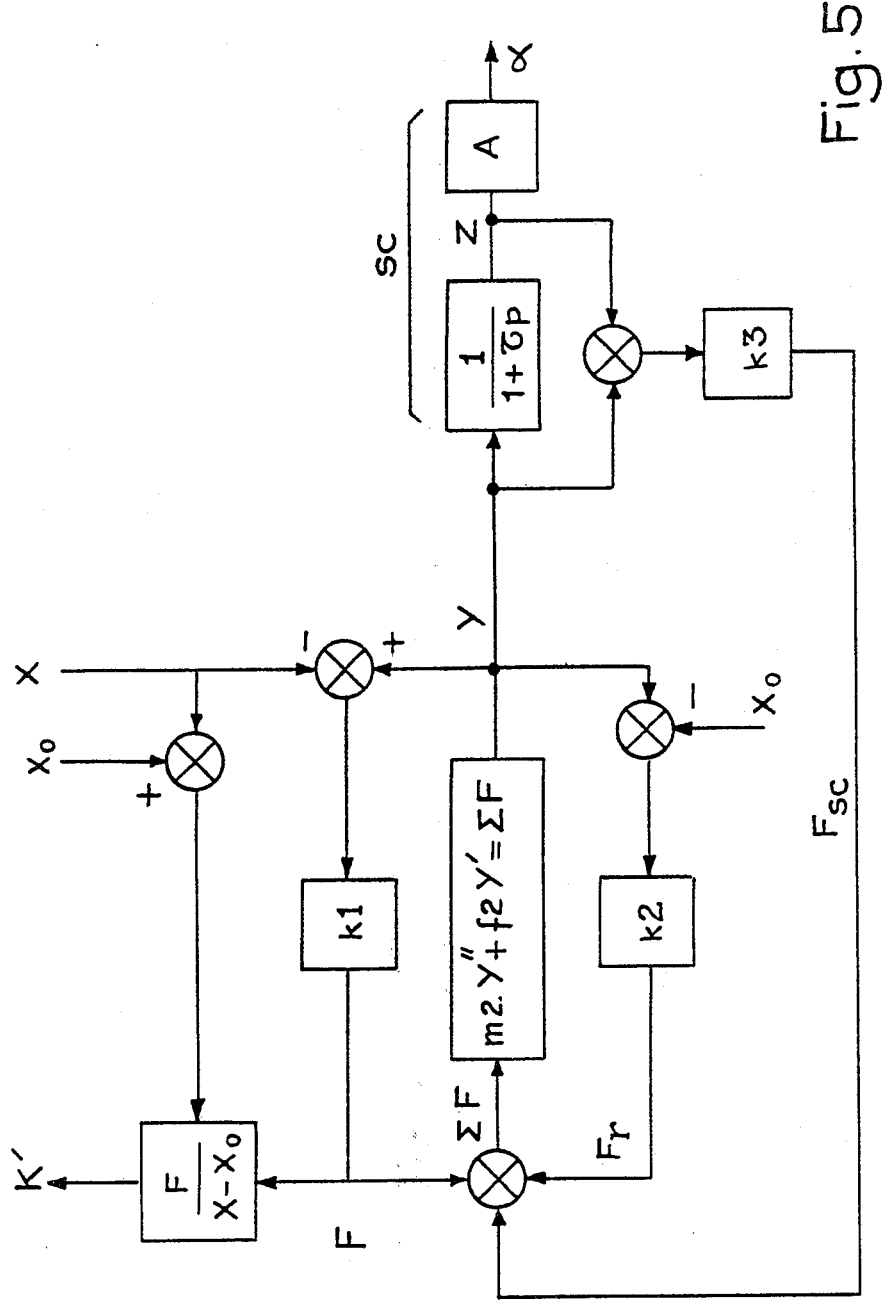
FIG. 5 is the flow diagram relating to the calculation of the coefficient K which is performed in the simulator shown in FIG. 4 and in accordance with the mechanical model shown in FIG. 1.
Figure 6:
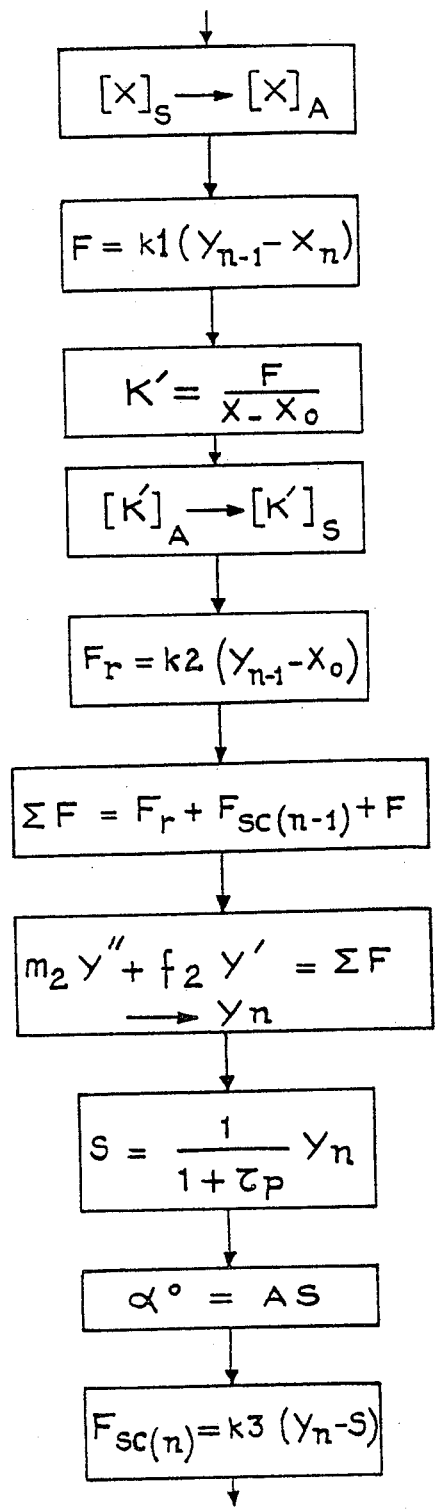
FIG. 6 is the flow-chart corresponding to the computing operations expressed by the diagram in FIG. 5.

The value of coefficient K is determined by the electronic system SE. This circuit essentially comprises an analogue multiplier circuit M2, a smoothing filter FL, digital computing circuits C and their interface IF, and a subtract circuit ST. When the control simulator is used in a flight training system, the digital calculation circuits may in fact be the central computer of the simulator. The signal on lead 6 of amplitude X is applied to interface IF and the subtract circuit is also fed from the interface with the signal on lead 11 of amplitude Xo, and feeds the multiplier M2 with a signal on lead 12 of amplitude X−Xo. For each computation cycle, the computing circuits C calculate the value F as well as the ratio $K'=F/X-Xo$ (1). The interface produces a stepped signal on lead 10 whose amplitude, constant during each cycle, is equal to the ratio K'. The signal on lead 10 is applied to filter FL which smooths it and produces a signal on lead 9 of amplitude K equal to the smoothed value of the ratio K'. The signal on lead 9 is applied to the analogue multiplier M2, which produces a signal on lead 4 of amplitude equal to the product $K\times(X-Xo)$ and, with very high accuracy, also equal to the required value F as a result of the above relationship 1. The advantage of this method is explained by the fact that the middle part of the force curve (FIG. 2), corresponding to the control threshold, consists of a straight line AB which crosses the X-axis at point Xo. This results in a constant ratio K' as long as the control moves in the threshold region. This is also the case for the amplitudes of the signals on leads 10 and 9. The signal on lead 4 threfore varies in a continuous manner in this region as a function of the variations of the signal on lead 6. The problem of providing smoothing suitable for both the central part and the outer parts of the force curve is thus avoided. Smoothing is no longer required for the central part. The characteristics of filter FL are adapted only, and therefore more easily, to the outer parts of the force curve. The computing circuits are advantageously of the general-purpose, programmable type. The calculation cycle typically takes 5 to 15 ms. The memory capacity is approximately 0.5K 16-bit words. Multipliers M1 and M2, as well as the substract circuit ST, are advantageously commercially available integrated circuits currently. The smoothing filter FL comprises a simple second-order conventional active filter including an operational amplifier and two R-C networks. For a calculation cycle of 10 ms, for example, the cut-off frequency of this filter is 25 Hz, whilst its damping factor is 0.4. The calculations to be performed by the computing circuits in accordance with the invention are summarized by the diagram in FIG. 5. The time-constant of the servocontrol SC is represented by the letter τ. The displacement of this servocontrol on the piston rod Ti is designated by Z. The values of Z and α are related by a coefficient A of proportionality. The values of all the parameters required for computing K' are stored in memory. These values may vary as a function of flight conditions and control status. They are calculated either in the central computer or in circuits specific to the flight-control simulator from tables of data supplied by the aircraft manufacturer and corresponding to the curves $Fr=f(X)$. FIG. 6 shows the various stages of the calculation of value F and ratio K'. The symbols [ ]$_s$ or [ ]$_a$ indicate if the value concerned is measured in "simulator" or "aircraft" units. The value X calculated during cycle n is subtracted from the value Y calculated during cycle n−1.

Although the principles of the present invention are described above in relation to a specific practical example, it should be clearly understood that the said description is given as an example only and does not limit the scope of the invention.

We claim:

1. An electro-hydraulic control simulator for generating a reaction force for a control which is displaced by an operator, which comprises:
    a double-action, hydraulic actuator including a piston which moves an amount X which is proportional to the displacement of said control by said operator;

a displacement sensor associated with said piston for producing an output signal which is proportional to the piston displacement X; and an hydraulic actuator servocontrol loop for producing a servo signal of amplitude F, $F=f(X)$, which represents part of the reaction force opposing the control force generated by the operator and which is also a function of the displacement X, the function $F=f(X)$ being represented by a curve having a central linear region corresponding to a threshold zone about $X=Xo$, said servo-control loop including:

(a) means, connected to said displacement sensor, for generating an output signal of value $X-Xo$;

(b) means, connected to said displacement sensor, for generating an output signal of value $F/X-Xo$, the amplitude of said signal being constant over the central region of said curve and being staircased over the outer regions of said curve; and (c) an analog multiplication circuit connected to the outputs of said $X-Xo$ and $F/X-Xo$ signal generating means for performing an analog multiplication thereof.

2. The simulator according to claim 1, further comprising:

(d) filter means positioned intermediate said $F/X-Xo$ signal generating means and said analog multiplication circuit, said filter means being operative to filter the output of said $F/X-Xo$ signal generating means for those values of F lying on the outer regions of said curve.

3. The simulator according to claim 1 further comprising:

(e) a velocity sensor associated with said piston for producing an output signal which is proportional to the displacement velocity $X'$ of said piston;

(f) a stress gauge associated with said piston for producing an output signal which is proportional to the force Fp applied to said piston; and (g) a summing circuit connected, inter alia, to the outputs of said velocity sensor, stress gauge and analog multiplication circuit to sum the same thereby to produce a servo control signal for said hydraulic actuator.

4. The simulator according to claim 3 wherein said hydraulic actuator is connected to and controlled by a servo-valve for the energising hydraulic fluid, said servo-valve being selectively opened and closed by the output from said summing circuit, said simulator further comprising:

(h) an integrator having an integration constant ml equal to the mass of the linkage model, said integrator being interposed between said summing circuit and servo-valve and generating an output signal proportional to $ml.X'$; and (i) a multiplier whose multiplying factor is equal to the damping fl of the linkage model connected between the output of said integrator and another input to said summing circuit, said multiplier generating an output signal proportional to $fl.x'$.

5. The simulator according to claim 4 further comprising:

(j) an amplifier/limiter interposed between said velocity sensor and said summing circuit, the output from said amplifier/limiter being proportional to the absolute value of the friction fs of said linkage model and having a sign dependent on $X'$, the displacement velocity of said piston.

6. The simulator according to claim 1 wherein the transfer function defined by the inputs and output of said summing circuit satisfies the relationship:

$$Fp=ml.X''+fl.X'\pm fs+K(X-Xo)$$

7. The simulator according to claim 6 wherein said $X-Xo$ signal generating means comprises a subtracting circuit having one input connected to said displacement sensor, and said $F/X-Xo$ signal generating means comprises a general purpose digital computer for computing, during each computation cycle, the value F and the ratio $K'=F/X-Xo$.

8. The simulator according to claim 7 further comprising an interface circuit connected to said digital computer and having a first output connected to the second input of said subtractor and a second output connected to said filter means, said interface generating a staircase signal whose amplitude, constant during each computation cycle, is equal to the ratio $K'$.

9. A control electrohydraulic simulator consisting of a double-action hydraulic actuator whose piston moves an amount X proportional to the displacement of an operator's control, a displacement sensor associated with the said piston and producing a signal of amplitude proportional to X, a hydraulic actuator servocontrol loop producing a servo signal of amplitude equal to a function $F=f(X)$ representing the part of the reaction opposing the control force applied by the trainee and which is a function of the displacement X, this control loop comprising digital computation circuits and function F being represented by a curve possessing a central linear part corresponding to a threshold zone about the value $X=Xo$, characterized by the fact that the said servocontrol loop possesses first means producing a signal of value $X-Xo$, second digital computation means producing a signal of amplitude $F/X-Xo$, this amplitude being constant in the said central part of the curve representing F and being in steps over the outer parts of this curve, and an analogue multiplication device connected to the said first and second means for performing the analogue multiplication of the signals produced by these means.

10. An electrohydraulic simulator in accordance with claim 9, characterized by the fact that the said second means are connected to the said multiplication device via a filter which is useful only over the outer parts of the said curve.

* * * * *